United States Patent [19]
Mutsaers et al.

[11] Patent Number: 5,916,607
[45] Date of Patent: Jun. 29, 1999

[54] PROCESS FOR INCREASING THE VOLUME OF A BAKED PRODUCT

[75] Inventors: Johanna Henrica Gerdina Maria Mutsaers, Delft, Netherlands; Johannes Henricus Van Eijk, Montreal, Canada

[73] Assignee: Gist-brocades B.V., Netherlands

[21] Appl. No.: 08/863,140

[22] Filed: May 27, 1997

Related U.S. Application Data

[63] Continuation of application No. 08/491,761, Jun. 19, 1995, abandoned.

[30] Foreign Application Priority Data

Jun. 17, 1994 [EP] European Pat. Off. .............. 94201742

[51] Int. Cl.$^6$ ..................................................... A21D 2/00
[52] U.S. Cl. .............................. 426/20; 426/18; 426/62; 426/549
[58] Field of Search ................................ 426/20, 18, 27, 426/62, 19, 549

[56] References Cited

U.S. PATENT DOCUMENTS 4,990,343 2/1991 Haarasilta et al. ......................... 426/10

OTHER PUBLICATIONS

Kim, H.O., et al., "Modification of What Flour Dough Characteristics by Cycloheptaamylose," *Cereal Chemistry*, vol. 61, No. 5., 1984, pp. 406–409.

Tao, B.Y., "Cyclodextrin Glucanotransferases," Chapter 28 in *Enzymes in Biomass Conversion*, Washington, D.C.: American Chemical Society, 1991, pp. 372–383.

Starnes, R.L., et al., "Starch Liquifaction with a Highly Thermostable Cyclodextrin Glycosyl Transferase from *Thermoanaerobacter* Species," Chapter 29, in *Enzymes in Biomass Conversion*, Washington, D.C.: American Chemical Society, 1991, pp. 384–393.

Abstract Melentev, A.I., et al., "Preparation Dough Produce Bread Roll Heat Mixture Part Flour Water Add Active Alpha Amylase Treat Cyclodextrin Glucan Transferase Preparation," AS Urals Sec Bashkir Biol Inst, Kemer Food Ind Techn Inst, Jul. 30, 1992, London: Derwent Publications, Ltd., GB; Class D11, AN 93–234161 & SU–A–1 750 571.

*Primary Examiner*—Leslie Wong
*Attorney, Agent, or Firm*—Morrison & Foerster LLP

[57] ABSTRACT

The present invention relates to use of cyclodextrin glucanotransferase in the preparation of doughs for baked products, e.g. bread doughs. In particular, the invention provides a process for the preparation of a dough for a baked product which includes incorporating into the dough cyclodextrin glucanotransferase in an amount to increase the volume of the baked product.

9 Claims, No Drawings

PROCESS FOR INCREASING THE VOLUME OF A BAKED PRODUCT

This is a continuation of application Ser. No. 08/491,761, filed Jun. 19, 1995, now abandoned.

The present invention relates to bread improver compositions and to methods using such compositions to improve the quality of baked products such as bread.

Bread improvers are complex mixtures containing various functional ingredients such as oxidizing and reducing agents (e.g. ascorbic acid, cysteine), enzymes (e.g. α-amylase, hemicellulase), emulsifiers (e.g. DATA- ester, monoglycerides, SSL), fatty materials (e.g. fat, lecithin) and carriers or bulk materials (starch, sugars, etc). Many commonly used bread improvers contain fats which are used for improving volume and crumb softness. However, it is advantageous to minimize the use of fats as there is a strong consumer demand for healthier food, and particularly for food with a reduced fat content.

Also, to improve the nutritional quality of bread, defatted milk powder is often added to the dough. This addition, though, results in a decreased loaf volume. To counteract this, fatty shortening is normally added to such doughs containing milk powder in order to maintain a high loaf volume. Again, this leads to an undesirably high fat content.

The resistance of consumers to fatty additives is growing and therefore there is a constant need to replace shortening by consumer-friendly additives, thus providing baked products with a low fat content and a high loaf volume.

β-cyclodextrin (cycloheptaamylose, cyclomaltodextrin or Schardinger dextrin) has been found (H. O. Kim and R. D. Hill (Cereal Chemistry (1984) 61, No. 5, 406–409)) to increase loaf volume. β-cyclodextrin increases the swelling power and solubility of wheat starch granules during gelatinization. This results in an increase of loaf volume, a higher water absorption in the Farinograph, an increased development time, and a better mixing tolerance. It also improves bread flavour. A serious drawback of this use of β-cyclodextrin is that it increases the stickiness of the dough. This makes doughs containing β-cyclodextrin unsuitable for handling by machines.

Another serious drawback of using β-cyclodextrin is that high levels of it, typically between 1 and 2% (based on flour weight), are required to obtain the desired increase in loaf volume.

It is an object of this invention to overcome these problems and to provide baked products having improved flavour, increased volume and a reduced fat content.

The term "baked product" as used herein will be understood to refer any baked product based on cereals such as wheat and/or rye flour and incorporating yeast and water. In most cases salts will also be present, optionally with fats, emulsifiers, enzymes, sugar and other additives. In preparation, these ingredients will be mixed to a homogeneous dough or batter, left for some time at a suitable temperature and baked to produce a consumable, airy product such as bread.

Accordingly, the invention provides, in one aspect, a process for the preparation of a dough for a baked product which comprises incorporating into the dough cyclodextrin glucanotransferase in an amount to increase the volume of the baked product.

According to the present invention, cyclodextrin glucanotransferase (CGT'ase) is incorporated into a bread improving composition which is added to the other dough ingredients. In a further aspect, the invention thus provides a bread improver composition for use in a process of the invention which comprises cyclodextrin glucanotransferase and one or more additional dry dough ingredients. Such a composition may, for example, comprise all or a portion of the flour required for the preparation of the baked product. Cyclodextrins are formed in situ by the action of CGT'ase converting starch and starch related compounds in the dough.

Surprisingly it has been found that the use of CGT'ase in place of β-cyclodextrin does not cause the dough handling problems observed when using β-cyclodextrin to improve bread quality. Whereas doughs containing β-cyclodextrin become very sticky and therefore difficult to handle during rounding and moulding, doughs containing CGT'ase have excellent machinability, possibly because the action of CGT'ase ensures that cyclodextrins are formed gradually in the dough after mixing. Therefore, only small amounts of cyclodextrins are present during the early stages of production of the baked product such as the initial dough forming steps immediately after mixing, when high levels of cyclodextrins could cause severe dough stickiness. Moreover, CGT'ase produces not only β-cyclodextrin but also other cyclodextrins which contribute to improved dough and baked product characteristics, such as loaf volume and flavour.

In general CGT'ases suitable for use according to the present invention have the following characteristics:
- they are "extracelluar" in the sense that they are produced extracelluarly or secreted;
- they may require $Ca^{2+}$ to remain active;
- their pH optimum is slightly acid.

The temperature optimum of CGT'ase used is a parameter of less importance, but CGT'ases having both high and low temperature optima can be used according to the invention. For example, a CGT'ase having a temperature optimum of 30–60° C. (thermolabile) and/or a thermostable CGT'ase (optimum of 80–95° C.) can be advantageously used in the preparation of baked products.

Cyclodextrin glucanotransferase enzymes (known as CGT'ase, cyclomaltodextrin glucanotransferase or *Bacillus macerans* amylase; E.C. 2.4.1.19) are some of the most unusual members of the amylolytic glucosidase family. Whereas most glucosidases predominantly catalyse a single reaction, CGT'ase possesses both strong hydrolytic and synthetic capabilities, as well as having multiple product specificity. CGT'ases produce cyclodextrins with 6, 7 and 8 glucosyl residues and a variety of linear malto-oligosaccharides, via disproportionation and coupling reactions.

Cyclodextrins are composed of glucose residues linked by α-1,4 glycosidic bonds to form a ring-shaped saccharide with no reducing end.

CGT'ases from several microbiological species have been islolated. Suitable CGT'ases for the purpose of the present invention can, for example, be obtained from Bacillus species such as *Bacillus macerans Bacillus stearothermophilus Bacillus amyloliguefaciens, Bacillus megaterium, Bacillus subtilus, Bacillus ohbensis,* or from Micrococcus species, from *Klebsiella Pneumonia, Klebsiella Oxytoca* or from Thermoanaerobacter. Suitable CGT'ases can also be produced by recombinant methods in genetically engineered host strains which have been rendered suitable for the production of CGT'ase. For example, *Escherichia coli* expressing CGT'ase genes can act as a source of the enzyme. More information on CGT'ase is given by B. Y. Tao (Enzymes in Biomass Conversion (1991) chapter 28, 372–383; American Chemical Society). Several enzyme preparations of CGT'ase are commercially available and these are suitable for use in the invention.

Any effective amount of CGT'ase may be used. In general, however 5 to 5000 units of CGT'ase per kilogram of flour will be employed, preferably, for example, 50 to 500 units per lkg flour. It will be appreciated that the preferred amount of CGT'ase will vary with the particular type of dough and dough making process used. Thus, in the case of an American straight dough process, a preferred amount may be, for example, from 75 U/kg to 300 U/kg, whilst, in a Dutch bread making process, a preferred amount may be, for example, 175 U/kg to 375 U/kg.

CGT'ase preparations and bread improver compositions having low or very low amounts of protease are preferred.

In addition to CGT'ase, bread improver compositions, and doughs of the invention may advantageously comprise glucose oxidase. The addition of glucose oxidase reduces the stickiness of the dough.

The present invention will be further demonstrated by the following examples. It should be noted that the present invention is by no means limited to these examples.

For the purposes of these Examples, Enzyme activity was measured by the Phadebas™ Amylase Assay from Pharmacia. In this method the solubilisation of dye-labelled starch by CGT'ase in a buffer (0.1 M acetate, 2.5 mM $CaCl_2$, pH 5.5) during 15 minutes at 30° C. is measured spectrophotometrically. One Unit equals about 10 SKB units. The use of an amylase assay for the determination of CGT'ase activity has been described by R. L. Starnes et al; (Enzymes in Biomass Conversion, ch. 29, Starch liquefaction, 1991, American Chemical Society.)

Example 1

This example demonstrates the applicability of CGT'ase as a fat replacer in an American straight dough process.

Pup-loaves were baked from 150 g dough pieces obtained by mixing 200 g wheat flour (100%), 106 ml water Delft, The Netherlands), 3 g salt (1.5%), 12 g sugar (6%), 8 g defatted milk powder (4%), 4 mg ascorbic acid (20 ppm) and a variable amount of CGT'ase (from *Bacillus macerans*) or shortening or β-cyclodextrin. After mixing for 6 minutes and 15 seconds at 52 r.p.m. in a pin mixer, the dough was divided, proofed for 1 hour and 45 minutes at 30° C., punched, proofed for an additional 25 minutes, moulded and panned. After a final proof of 50 minutes at 30° C., the dough was baked for 20 minutes at 200° C. Loaf volume was determined by the rapeseed displacement method.

The results obtained are given in Table 1.

TABLE 1

| Additions | Volume (%) |
| --- | --- |
| none | 100 |
| Shortening 3% | 124 |
| 75 U/kg CGT'ase | 118 |
| 300 U/kg CGT'ase | 132 |
| Amylase P200 (25 ppm) and Amylase H400* (150 ppm) | 113 |
| β-cyclodextrin 1.5% | 120 |

Amylase P200 is a fungal amylase and Amylase H400 is an amylase with hemicellulase activities, both from Gist-brocades.

The effect on volume obtained with shortening can be obtained or even improved with CGT'ase. Furthermore it is clear from the results that the volume effect of CGT'ase is even bigger than the effect that is obtained with the combination of Amylase P200 and H400. This latter combination is a mixture of enzymes commonly used by the baking industry for improving bread quality.

Example 2

This example demonstrates the effect of CGT'ase on volume in a Dutch type of bread.

Pup-loaves were baked from 160 g dough pieces obtained by mixing 200 g wheat flour (100%), 106 ml water (53%), 1.4. g instant dry yeast (0.7%, Gist-brocades N.V., Delft, The Netherlands), 4 g salt (2%), 3 g sugar (1.5%), 5 mg fungal α-amylase P200 (25 ppm, Gist-brocades), 4 mg ascorbic acid (20 ppm) and a variable amount of CGT'ase (from *Bacillus macerans*) or β-cyclodextrin. After mixing for 6 minutes and 15 seconds at 52 r.p.m. in a pin mixer, the dough was divided, proofed for 1 hour and 45 minutes at 30° C., punched, proofed for an additional 25 minutes, moulded and panned. After a final proof of 70 minutes at 30° C., the dough was baked for 20 minutes at 225° C. Loaf volume was determined by the rapeseed displacement method.

The results obtained are given in Table 2.

TABLE 2

| Additions | Volume (%) |
| --- | --- |
| none | 100 |
| 175 U/kg CGT'ase | 116 |
| 375 U/kg CGT'ase | 122 |
| β-cyclodextrin 2% | 114 |

The results show that the effect of CGT'ase on volume is greater than the effect of 2% β-cyclodextrin.

We claim:

1. A process for increasing the volume of a baked product which process comprises adding to the dough to be baked into said product a composition comprising cyclodextrin glucanotransferase in an amount effective to produce cyclodextrin in situ in said dough sufficient to increase the volume of the resultant baked product without enhancing the stickiness of the dough, said composition being free of cyclodextrin.

2. The process of claim 1 wherein said amount of cyclodextrin glucanotransferase is 5–5000 units per kg flour in said dough.

3. The process of claim 2 wherein said amount of cyclodextrin glucanotransferase is 50–500 units per kg flour in said dough.

4. The process of claim 1 wherein said dough is substantially free of shortening.

5. The process of claim 2 wherein said dough is substantially free of shortening.

6. The process of claim 3 wherein said dough is substantially free of shortening.

7. The process of claim 4 wherein said dough comprises defatted milk powder.

8. The process of claim 1 wherein said dough comprises glucose oxidase.

9. The process of claim 1 wherein said composition further comprises glucose oxidase.

* * * * *